United States Patent [19]

Taniguchi

[11] 4,274,730
[45] Jun. 23, 1981

[54] SYSTEM FOR INPUTTING INFORMATION INTO DIGITAL CONTROL CIRCUIT MEANS OF A CAMERA

[75] Inventor: Nobuyuki Taniguchi, Sakai, Japan

[73] Assignee: Minolta Camera Kabushiki Kaisha, Osaka, Japan

[21] Appl. No.: 25,443

[22] Filed: Mar. 27, 1979

[30] Foreign Application Priority Data

Mar. 30, 1978 [JP] Japan ................................ 53/37894

[51] Int. Cl.³ ............................................ G03B 17/18
[52] U.S. Cl. .................................... 354/289; 352/170; 354/23 D
[58] Field of Search ................ 354/289, 23 D, 53, 58, 354/61, 72, 127, 198, 207, 271, 273; 307/221 R; 352/170

[56] References Cited

U.S. PATENT DOCUMENTS

| | | | |
|---|---|---|---|
| 3,928,858 | 12/1975 | Sakurada | 354/23 D |
| 4,103,308 | 7/1978 | Sakurada | 354/23 D |
| 4,191,458 | 3/1980 | Kawamura | 354/53 |

FOREIGN PATENT DOCUMENTS 50-90324  7/1975  Japan ................................... 354/23 D Primary Examiner—L. T. Hix
Assistant Examiner—Stafford D. Schreyer
Attorney, Agent, or Firm—Wenderoth, Lind & Ponack

[57] ABSTRACT

A system for inputting information into a camera digital control circuitry, including a clock pulse generator; scanning circuitry having a plurality of output terminals to be successively scanned one by one in synchronism with consecutive pulses of a clock pulse train; at least one terminal selector for selecting one of the output terminals according to the predetermined selection; and at least one counting circuitry for counting the clock pulses successively generated, wherein at least one digitalized information signal, output from the counting circuitry at a predetermined time when one of the output terminals selected in advance is scanned, is inputted through the terminal selector to the camera digital control circuitry as a digitalized information word in correspondence with the selection.

29 Claims, 14 Drawing Figures

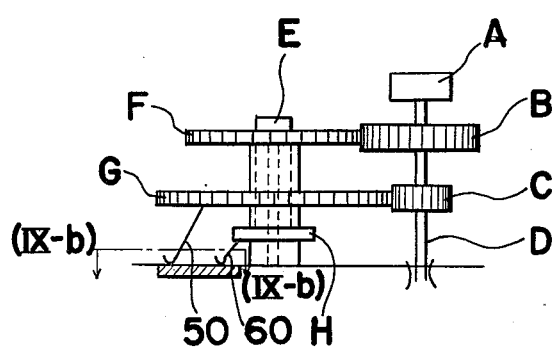
Fig. 9-a
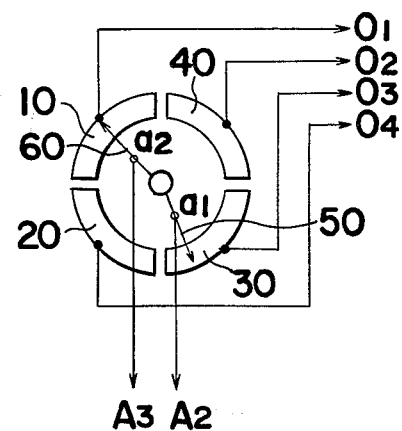
Fig. 9-b
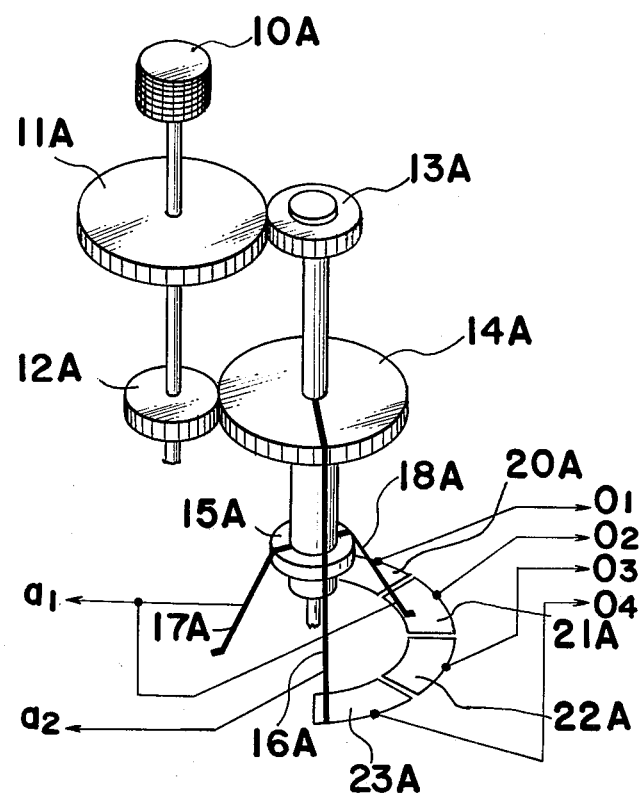
Fig. 10

SYSTEM FOR INPUTTING INFORMATION INTO DIGITAL CONTROL CIRCUIT MEANS OF A CAMERA

BACKGROUND OF THE INVENTION

This invention relates to a system for inputting information to be set in advance into a digital control circuit means of a camera, which is applicable, for example, to an automatic exposure control means of cameras so as to set in digitalized photographic information.

As for circuit means such as the automatic exposure control circuit means of cameras, complete digitalization of the above-mentioned circuit means has often been proposed, and accordingly, a number of proposals concerning arrangements for inputting information into the digital circuit means are already well known to those skilled in the art.

According to one of the prior art arrangements, the introduction of a decoder is proposed as a means for the above-mentioned input system, wherein a specific binary code is arranged to be output from the decoder in correspondence with the selection of one of a plurality of input terminals of the decoder. However, in such a case, not only must a specifically designed decoder having special functions to accomplish the above-mentioned purpose be provided, but the decoder requires quite a large number of specific input terminals.

Another one of the conventional arrangements for a system for inputting information into the digital circuit means can be found in Japanese Laid Open Patent Application No. 50-90324 (1975). The system includes a camera having an automatic exposure control means including a digital computing circuit, in which various photographic information are digitalized so that the output signal from the circuit mentioned above may introduce a set value of the correct exposure. There is further provided an actuator means having a plurality of contacts which are respectively arranged to be changed-over in response to a manual setting of a shutter speed dial, and a circuit means for setting a shutter speed, which is arranged to apply the respective output signals coded in advance to the corresponding terminals of the digital computing circuit mentioned above depending upon the respective, resultant change-over states of the plurality of contacts mentioned above.

However, the arrangement described above requires quite a complicated switching circuit means and is not arranged to be relatively, compactly constructed, particularly if the absolute number of values of information of even the same kind is to be increased, and when several specific classifications of the information is desired.

Furthermore, according to one of other alternative proposals, a certain binary code is arranged to be input through every contact between a code board including a plurality of portions to be contacted, such as the gray code board, and a plurality of brushes, the number of respective contacts between the above mentioned portion and brush directly corresponding to the bit number. However, even by the arrangement as described above, there still remain some problems in that not only is the specific pattern to be ready for the code board quite complicated, but also the number of respective contacts mentioned above corresponding to the number of bits arranged for the code board mentioned above, as specifically disclosed in U.S. Pat. No. 3,928,858 (1975) are large. Furthermore, more specifically, the arrangement mentioned above has a fatal, specific disadvantage in that the output of the wrong binary code cannot be substantially avoided, if one of the brush and portion contacts prepared in a manner as mentioned above is simply brought into poor contact with each other.

Furthermore, according to a still further proposal disclosed in Japanese Laid Open Patent Application (Tokkaisho) No. 50-337264, there is provided a system for inputting information into a digital control circuit means. As far as the above-mentioned system is concerned, a train of clock pulses is arranged to be input into a counter means through manually pressing a button, so that the output from the counter means is not only utilized as a representation of the photographic informaton, but also is displayed at the same time during the above-mentioned pressing of the button. More specifically, according to the above-mentioned system, a photographer handling the camera equipped with the above-mentioned system has to continuously press the button and simultaneously, to pay attention to the display which varied in a non-continuous manner or a stepwise manner, until the display mentioned above reaches a predetermined value, so that a value corresponding to the value displayed at the instant of the releasing of the button is input into the digital control circuit means as the predetermined photographic information. Therefore, when the photographer happens to be not paying attention, the predetermined value is overlooked, and thereby, the above-mentioned setting actuation must again be repeated. Furthermore, in addition to the above-mentioned defects, it is naturally quite inconvenient for the photographer in that he must keep observing the above-mentioned display in the course of the setting in of the photographic. Moreover, since the speed of display varied in a manner as described in the foregoing can not help being limited within such a degree as to enable the photographer to confirm the respective non-continuous displayed value, it naturally takes a rather long period to set the predetermined photographic information therewith.

SUMMARY OF THE INVENTION

Accordingly, an essential object of the present invention is to provide a system for inputting information into a digital control circuit means of a camera, which is applicable for inputting at least one kind of information manually set in advance into the digital control circuit means of a camera, for example, inputting one or more pieces of information manually set into a digital exposure control means of cameras, so as to set the correst exposure value at one instant of time.

Another important object of the present invention is to provide a system for inputting information into a camera digital control circuit means of the above-described type, wherein at least one kind of digital information signal having respective predetermined bit numbers can be output without employing a complicated code board arrangement, such as a gray code, and furthermore, substantially decreasing the number of contacts, which inevitably corresponded to the bit numbers specifying the digital information signals even for the outputting of a single kind of digital information signal.

A further object of the present invention is to provide a system for inputting information into a camera digital control circuit means of the above-described type, wherein more than two kinds of digital information signals specified by different bit numbers, depending upon the kinds of information to be nearly simulataneously set in advance, can be separately or simulataneously output therethrough, and successively, input into the digital control circuit means of a camera without adding any provisional means for the purpose as mentioned above.

A still further object of the present invention is to provide a system for inputting information into a camera digital control circuit means of the above-described type, which is fabricated from a single combination of a plurality of conventional circuit components.

A further object of the present invention is to provide a system for inputting information into a camera digital control circuit means of the above-described type, which is simple in structure and thereby, readily incorporated in any kind of digital control circuit for use in cameras.

A still further object of the present invention is to provide a system for inputting information into a camera digital control circuit means of the above-described type, which is easily operative in association with the operation of a manual information setting actuator.

A further object of the present invention is to provide a system for inputting information into a camera digital control circuit means of the above-described type, which is highly efficient in use and, can be manufactured at low cost.

BRIEF DESCRIPTION OF THE DRAWINGS

These and other object and features of the present invention will become apparent from the following description taken in conjunction with the preferred embodiment thereof with reference to the accompanying drawings in which;

FIG. 9(a) is a side view of one embodiment of a mechanical arrangement employed for successively driving the pair of sliding members on the members to be contacted in accordance with the manual setting actuation of the information to be input, which is to be provided for the embodiment shown in FIG. 2. However, the number as well as the array of the members to be contacted are modified when compared with that shown in FIG. 4, FIG. 9(b) is a plain view downwardly seen with respect to line IX(b)—IX(b) shown in FIG. 9(a), but particularly showing the detailed contacting states of the respective sliding members to the respective terminals $a_1$ and $a_2$ and the plurality of members to be contacted and connected to the respective outputs $O_1$ to $O_4$, FIG. 10 is a perspective view of a slightly modified embodiment of that shown in FIGS. 9(a) and 9(b), but specifically indicating a detailed feature when the above-mentioned embodiment is applied to the setting dial of an exposure information system.

Figure 1:
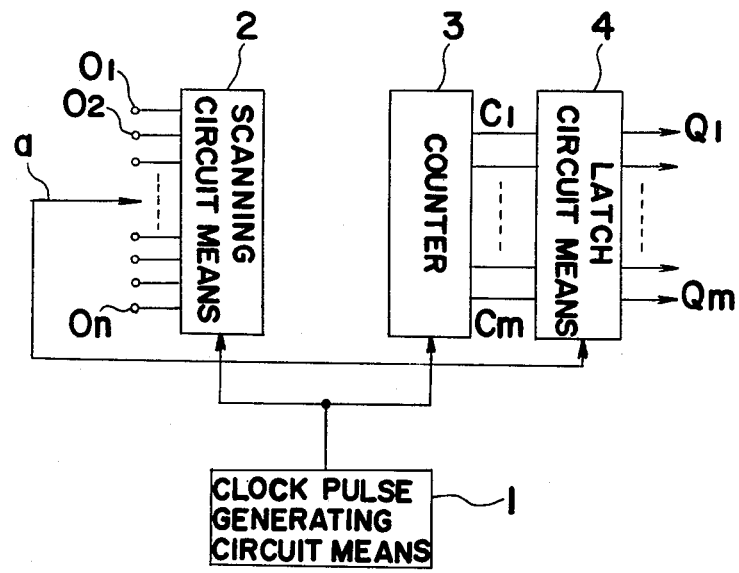
FIG. 1 is a block diagram, particularly showing one embodiment of a system for inputting information into a digital control circuit means of a camera according to the present invention.

Before the description of the present invention proceeds, it is to be noted that like parts are designated by like reference numerals throughout several views of the accompanying drawings, as long as the difference in reference numerals for like parts found in several embodiments of the present invention is specifically so denoted.

DETAILED DESCRIPTION OF THE INVENTION

Referring now to FIG. 1, there is schematically shown the base circuitry arrangement of one of the preferred embodiments of a system for inputting information into a digital circuit means of a camera according to the present invention. More specifically, the basic circuitry arrangement mentioned above comprises a clock pulse generating circuit means 1 for generating a train of clock pulses, a scanning circuit means 2 comprising a shift register provided with a plurality of outputs or output terminals labelled by $O_1$ to $O_n$, in which a logic high signal is successively shifted following the labelled order of $O_1$ to $O_n$ in synchronization with every pulse of a train of clock pulses, a binary counter 3 for counting the number of pulses constituting a train of clock pulses, and a latch circuit means 4 for latching respective signals sent from the binary counter 3 in response to an actuation when signal which occurs terminal a is converted from its logic low into its logic high state. A sliding member secured to the terminal a is to be selectively connected to one of the outputs $O_1$ to $O_n$ mentioned above in conjunction with the operation of a manual member for setting an exposure value (not shown here).

As long as a pulse train is not generated by the clock pulse generating circuit means 1, the output labelled $O_1$ of the shift register 2 is maintained in its high state while the rest of the outputs labelled $O_2$ to $O_n$ are maintained in a respective low state, whereby the contents of the counter 3 is maintained at a count of 0. Starting from the respective states of outputs $O_1$ to $O_n$ and counter 3, a train of clock pulses is to be added to the shift register 2 and binary counter 3. Soon after the first clock pulse of a pulse train is added to the shift register 2, the output $O_2$ is changed to its high state and thereby, the contents of the counter 3 is changed to have a count of 1. Following the transmission of a high signal from the shift register 2 in a manner synchronized with the respective clock pulses pulse train, the binary counter 3 counts the number of pulses of the train of clock pulses. As soon as the output terminal, to which the sliding member mentioned above is connected, is changed to be its high state following a series of successive shifts of the high signal in shift register 2 as described above, the terminal a is also converted into its high state, with the latch circuit means 4 being simulataneously brought into its latching condition by an actuation signal effected by the high signal resultantly output from the terminal a whereby the contents of the counter 3 is latched at the moment described above. The output signal of the counter 3 thus latched in latch circuit means 4, is a digital signal which is in correspondence with the specific selection of one of the outputs $O_1$ to $O_n$, and may be used to set the digitalized exposure information for an operation device.

Figure 2:
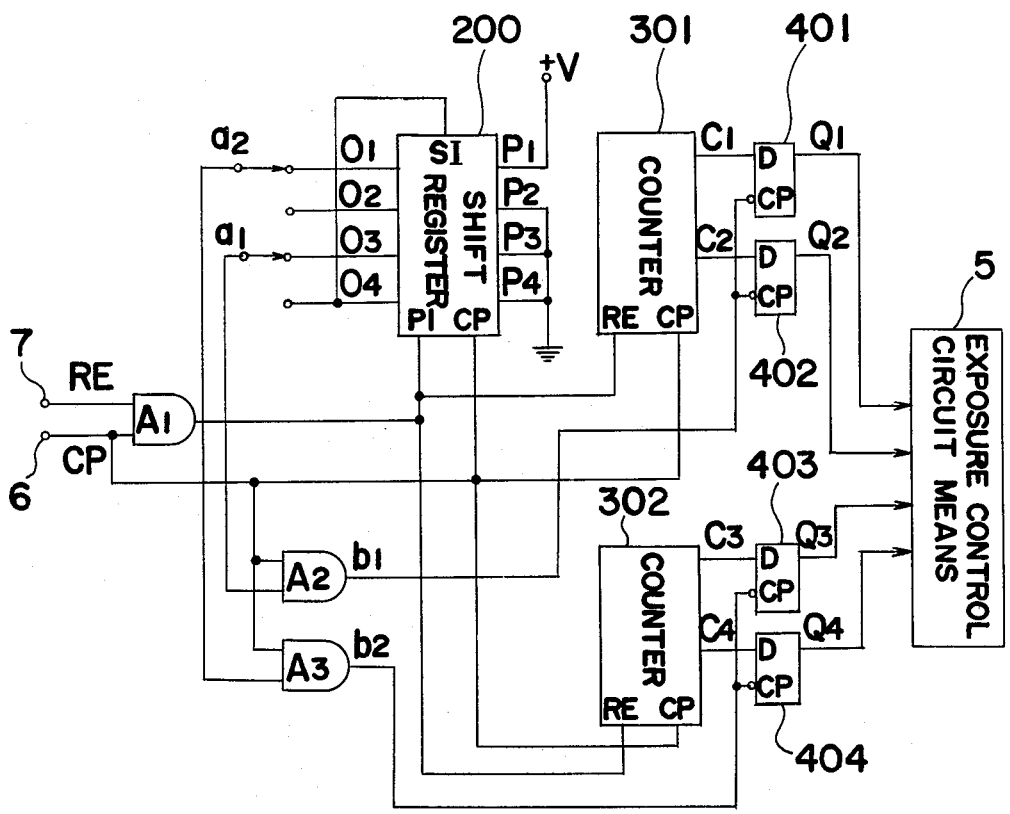
FIG. 2 is a view similar to FIG. 1, but particularly showing a block diagram of another embodiment according to the present invention.

Referring now to FIG. 2, there is shown another embodiment of the present invention, with the circuitry arrangement itself being, however, shown in much more detail. In FIG. 2, a shift register 200 is provided with four outputs respectively denoted by $O_1$ to $O_4$. As for the sliding member for selecting the above-mentioned outputs, a pair of sliding members are provided for this embodiment; the sliding members are respectively connected to the terminals $a_1$ and $a_2$. Accordingly, the number of binary counters for this embodiment is two, i.e., counters 301 and 302, and each binary counter is arranged to output a signal of two bits, respectively. As for the latch circuit means, there are correspondingly provided a pair of latch circuit means, wherein the latch circuit means having a pair of D-flip-flops 401 and 402 is connected to the binary counter 301, while the latch circuit means having a pair of D-flip-flops 403 and 404 is connected to the binary counter 302. The outputs from the respective latch circuit means are to combined, so that a four bit binary code is input into a digital exposure control circuit means 5.

Figure 3:
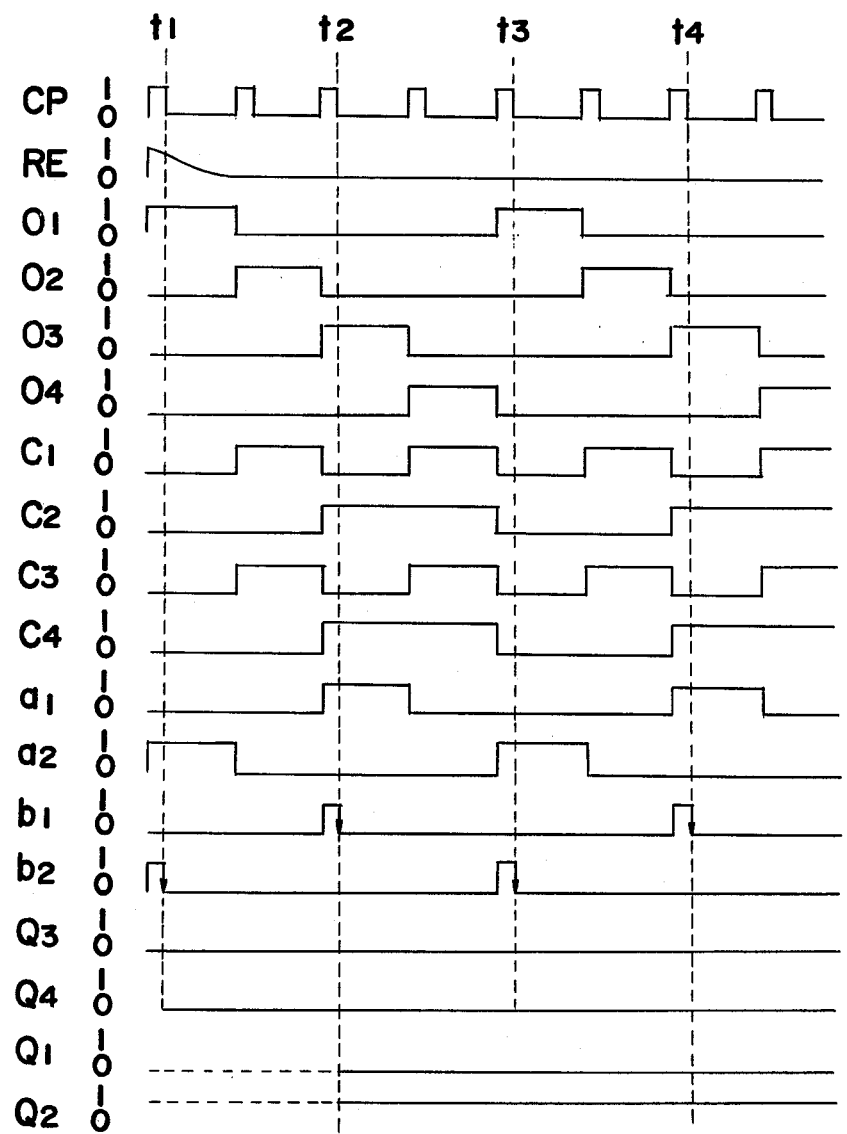
FIG. 3 is a time chart, particularly showing the functional characteristics of each component shown in FIG. 2 in synchronization with the successive generation of a train of clock pulses.

Referring now to FIG. 3, there are shown a plurality of time charts, showing respective patterns of a pulse train introduced into respective components of the circuitry arrangement described in FIG. 2. More specifically, with respect to CP terminal 6 as shown in FIG. 2, a cyclic clock pulse train denoted by CP in FIG. 3 is illustrated while, with respect to RE terminal 7, a resetting signal denoted by RE in FIG. 3 is illustrated. This resetting signal mentioned above is maintained in its high state in the course of time interval nearly equivalent to a cyclic period of the cyclic clock pulse train mentioned above. Following the arrival of this resetting signal to RE terminal 7, a gate of AND circuit $A_1$ is first rendered open and, successively, respective PI terminals Parallel in Terminals of the register 200 and respective RE terminals of respective counters 301 and 302 receive respective pulses, whereby the shift register 200 is brought into a state so as to receive a parallel date input. A parallel data input state represented by "1000" is correspondingly produced at the output terminals $O_1$ to $O_4$ in order, with respective outputs of the counters 301 and 302 being reset to render thin respective states equal to "00" at the same time.

Since the terminal $a_2$ is rendered high as can be seen from the specific pattern as shown by the pattern denoted by $a_2$ in FIG. 3 and successively, a gate of AND circuit $A_3$ is rendered open, a pulse train is output through the AND circuit $A_3$, the characteristic pattern of which is shown as the pattern denoted by $b_2$ in FIG. 3. Subsequently, due to the transition of the state of this pulse at $t_1$, as specifically shown in FIG. 3, the output from the counter 302 at time $t_1$ is latched by means of respective D-flip-flops 403 and 404, whereby the state represented by "00" is kept unchanged by means of D-flip-flops 403 and 404, so long as a pulse is not generated from the AND circuit $A_3$. The above-mentioned respective states are specifically illustrated by the respective characteristic patterns denoted by $Q_3$ and $Q_4$ during the time interval denoted by $t_1$ to $t_2$ as specifically shown in FIG. 3.

The terminal $O_2$ of the shift register 200 is rendered high through the leading edge of a successive pulse, and the outputs of the counters 301 and 302 are effected to be "01". Similarly, following the leading edge of a successive pulse, the terminal $O_3$ of the shift register 200 is rendered high, and the outputs of the counters 301 and 302 become "10", with the terminal $a_1$ being rendered high as can be seen by the pattern denoted by $a_1$ in FIG. 3, to successively generate a pulse through the AND circuit $A_2$ as can be seen by the pattern denoted by $b_1$ in FIG. 3. Such being the case as described above, due to the transition of the state of the pulse just mentioned above at $t_2$ as indicated in FIG. 3, the output from the counter 301 at $t_2$ is latched by means of respective D-flip-flops 401 and 402. Therefore, the state represented by "10" is kept unchanged, so long as a pulse is not generated by the AND circuit $A_2$. The above-described respective states are specifically illustrated by the respective patterns denoted by $Q_1$ and $Q_2$ during the time interval as denoted by $t_2$ to $t_4$ as specifically shown in FIG. 3. As is clear from the description in the foregoing, through the proceeding steps by means of the circuit arrangement as described above, a binary code specified by four bits is capable of being formed with the help of four clock pulses successively generated as a train of clock pulses.

After an initial setting of a certain binary code, due to the circuit arrangement of the present invention wherein the terminal $O_4$ of the shift register 200 is connected to a series input terminal SI, the level at terminal $O_1$ is again rendered high subsequent to the step where the level at terminal $O_4$ is rendered high, so that the successive change of level at terminals $O_1$ to $O_4$ are repeated in a circular fashion, as long as the train of pulses is inputted in a manner as described in the foregoing. In synchronization with the respective effects of the steps mentioned above, the four steps including the state represented by "11" and the successive state represented by "00" are correspondingly repeated in, as far as the outputs of the respective counters 301 and 302 are concerned. Accordingly, without resetting an exposure value set in advance, the paired D-flip-flops 403 and 404 output a digital information state of "00", and a digital information state of "10" is output by the paired D-flip-flops 401 and 402. However, the signals output from the respective D-flip-flops are capable of being modified within the time interval of a successive series of four clock pulses which are input soon after the exposure value is modified. More specifically, as long as the respective positions of terminals $a_1$ and $a_2$ as denoted in FIG. 2 are not changed, the binary code of four bits bearing information having the digital value of "0010", which is read in the sequential order of $Q_4$, $Q_3$, $Q_2$, $Q_1$, is unchanged.

According to the circuit arrangement as shown in FIG. 2, it is possible to output 16 different digital signal combinations. Furthermore, if one more combination including a sliding member, a binary counter of two bits, and a latch circuit means is additionally incorporated in the circuit arrangement mentioned above, a binary code of six bits is obtainable, whereby 2 to the 6th power, i.e., sixty four different combinations of digitalized signals can be output. Furthermore, respective time intervals to output respective binary codes are not different from each other, and are equivalent to a fixed period correspondingly equal to a time interval in which the scanning circuit means can scan the outputs of $O_1$ to $O_4$ through four pulses generated in succession following the successive pulsation of four pulses of the train of clock pulses.

Figure 4:
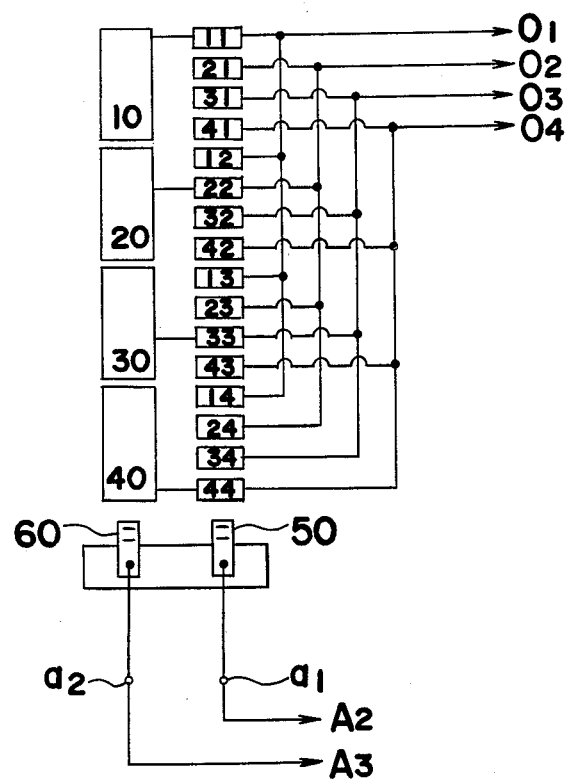
FIG. 4 is one embodiment of a disposal arrangement of a pair of sliding members and two arrays of members to be contacted so that an appropriate information selected is to be input into the system according to the present invention, which is to be incorporated into the embodiment shown in FIG. 2.

Referring now to FIG. 4, there is shown an embodiment, showing an arrangement for a pair of sliding members 50 and 60 each connected to respective terminals $a_1$ and $a_2$ and connected to a number of members to be contacted; the members are respectively connected to the outputs $O_1$ to $O_4$ of the register 200. The sliding members 50 and 60 mentioned above are paired mechanically, and therefore, a respective sliding member is capable of being moved for the same shifting measure with each other through the operation of an externally provided operating member (not shown here), wherein the sliding member 60 is successively slid on a specific array consisting of a plurality of members 10 to 40, with the sliding member 50 being successively slid on a specific array consisting of a plurality of members 11 to 44. As is clear from FIG. 4, the sliding member 50 is connected to one of the inputs of the AND circuit $A_2$ through the terminal $a_1$, while the sliding member 60 is connected to one of the inputs of the AND circuit $A_3$ through the terminal $a_2$. As is clear from FIG. 4, members 10, 11, 12, 13 and 14, which are to be slidably contacted, are respectively connected to the output terminal $O_1$ of the shift register 200, and members 20 to 24 are respectively connected to the output terminal $O_2$. Likewisely, members 30 to 34 are respectively connected to the output terminal $O_3$, and members 40 to 44 are connected to the output terminal $O_4$, respectively.

By the arrangement described in the foregoing, when the sliding member 60 is, for example, in contact with the member 10, and the sliding member 50 is in contact with the member 11, the combination of D-flip-flops 401 to 404 outputs the digital information signal "0000".

Similarly, in a contacting combination in which the sliding member 60 is in contact with the member 10, and the sliding member 50 is in contact with the member 21, the digital information signal "0001" is output. When, the sliding member 60 is in contact with the member 10, and the sliding member 50 is in contact with the member 31, the digital information signal "0010" is output. Moreover, when the sliding member 60 is in contact with the member 30, and the sliding member 50 is in contact with 43, the digital information signal "1011" is output.

Figure 5:
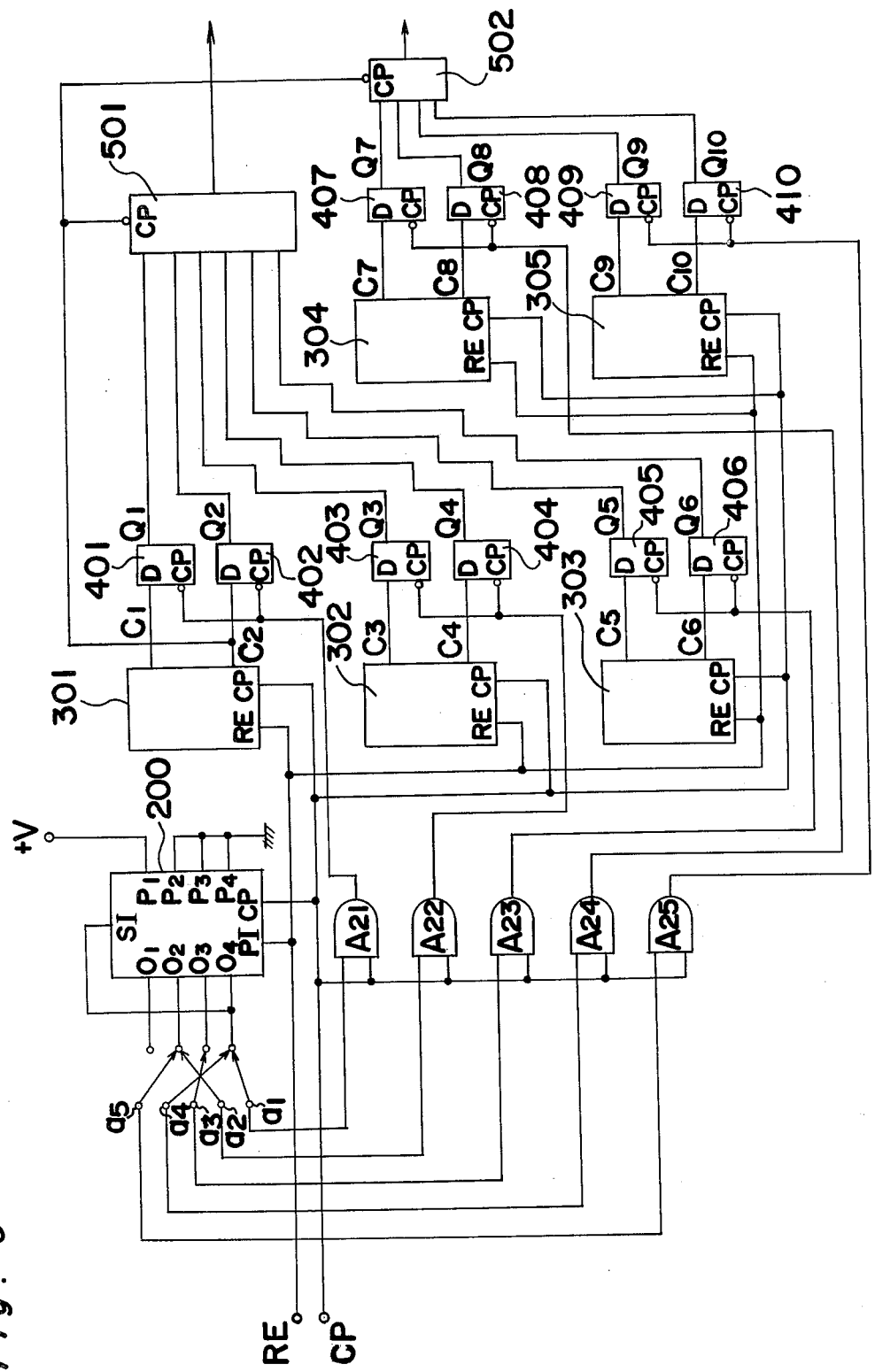
FIG. 5 is a view similar to FIG. 2, but particularly showing a block diagram of one modified embodiment of that shown in FIG. 2, wherein two forms of information, i.e., an information output having 4 bits as well as an information output having 6 bits are respectively obtainable.
Figure 6:
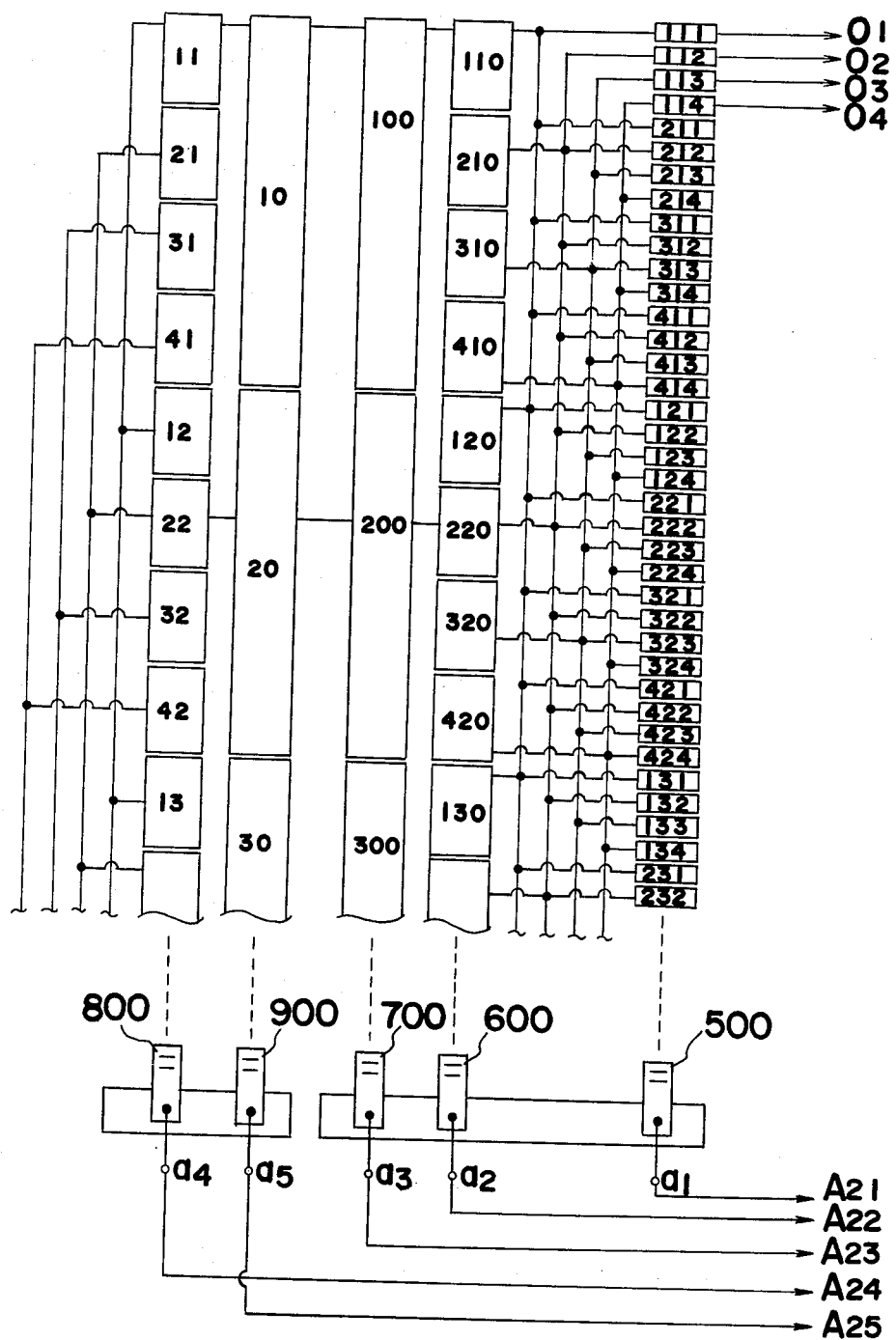
FIG. 6 is a view similar to FIG. 4, but particularly showing one modified embodiment of that shown in FIG. 4, wherein there is provided a disposal arrangement of two paired sliding members, one of which includes two sliding members with the other including three sliding members, and five corresponding arrays of members to be contacted so that an appropriate information selected is to be input into the system according to the present invention, which is to be incorporated in the embodiment shown in FIG. 5.

Referring now to FIG. 5, there is shown a modified embodiment of the arrangement in FIG. 2 according to the present invention, with which a six bit digital information signal as well as a 4 bits signal can be obtained. Furthermore, according to FIG. 6, there is shown a modified embodiment of the arrangement shown in FIG. 4, which is correspondingly employed for the provision for the embodiment shown in FIG. 5. More specifically, according to the embodiment shown in FIG. 6, there is shown an arrangement for sliding members respectively connected to corresponding terminals $a_1$ to $a_5$ and members connected to the respective outputs $O_1$ to $O_4$. Similarly, the sliding members 500 to 700 are slidably moved as a unit, and therefore, the movement of one respective member causes the simultaneous movement of the other mechanically connected members the same shift measure or space. However, the sliding member 500 is arranged to be successively slidably moved on the specific array comprising the plurality of members 111 to 444, and the sliding member 600 is correspondingly slidably moved on the specific array comprising the plurality of contacting members 110 to 440, and the sliding member 700 is slidably moved on the specific array comprising the plurality of members 100 to 400; members 500, 600, and 700 all slidably moved at the same time. Furthermore, according to the embodiment shown in FIG. 6, the respective sliding members 800 and 900 mentioned above are also arranged to be slidably moved as a unit, so that the respective sliding member 800 and 900 are also capable of being slidably moved simultaneously over the same sliding measure or the same sliding space. However, the sliding member 800 is arranged to be successively slidably moved on the specific array comprising the plurality of members 11 to 40, and the sliding member 900 is arranged to be simultaneously slidably moved on the specific array comprising the plurality of members 10 to 40. Consequently, there exists no major difference with respect to the circuit arrangement and functioning of the embodiments shown in FIG. 5 and FIG. 2, except that the provisions for specifically increasing the number of data bits are incorporated in the embodiment shown in FIG. 5.

According to the present embodiment, the terminal $a_1$ is connected to the output $O_4$, the terminal $a_2$ is connected to the output $O_2$, the terminal $a_3$ is connected to the output $O_3$, the terminal $a_4$ is connected to the output $O_4$ and the terminal $a_5$ is connected to the output $O_2$, respectively. Therefore, for example, the sliding member 500 is contacted with member 234, the sliding member 600 is contacted with member 230, the sliding member 700 is contacted with member 300, the sliding member 800 is contacted with member 42, and the sliding member 900 is contacted with member 20, respectively. Referring back to FIG. 5, as is clear from the arrangement of the present embodiment, the respective D-flip-flops 401 and 402 are to latch the contents of the counter 301 when the output from the counter 301 is high, while the respective D-flip-flops 403 and 404 are to latch the contents of the counter 302 when the output from the counter 302 is "01". Similarly, respective D-flip-flops 405 and 406 are to latch the contents of the counter 303 when the output from the counter 303 is "10". Respective D-flip-flops 407 and 408 are to latch the contents of the counter 304 when the output from the counter 304 is "11". Respective D-flip-flops 409 and 410 are to latch the contents of the counter 305 when the output from the counter 305 is "01".

Each output from D-flip-flops 401 to 410 is stored in one of the registers 501 and 502 upon the trailing edge of the signal corresponding to the upper bit output through one of the counters, the trailing edge of each of which is made into a "trailing edge" by synchronization with every "leading edge" of the fourth pulse of the continuously generated train of clock pulses, and thereafter, the respective stored digitalized information is subsequently output to the computing control circuit means. Such being the case as shown in FIG. 5, the digitalized information specifically defined by six bits, i.e., "110110" is output from the register 501, while the digitalized information specifically defined by four bits, i.e., "1101" is output from the register 502.

Figure 7:
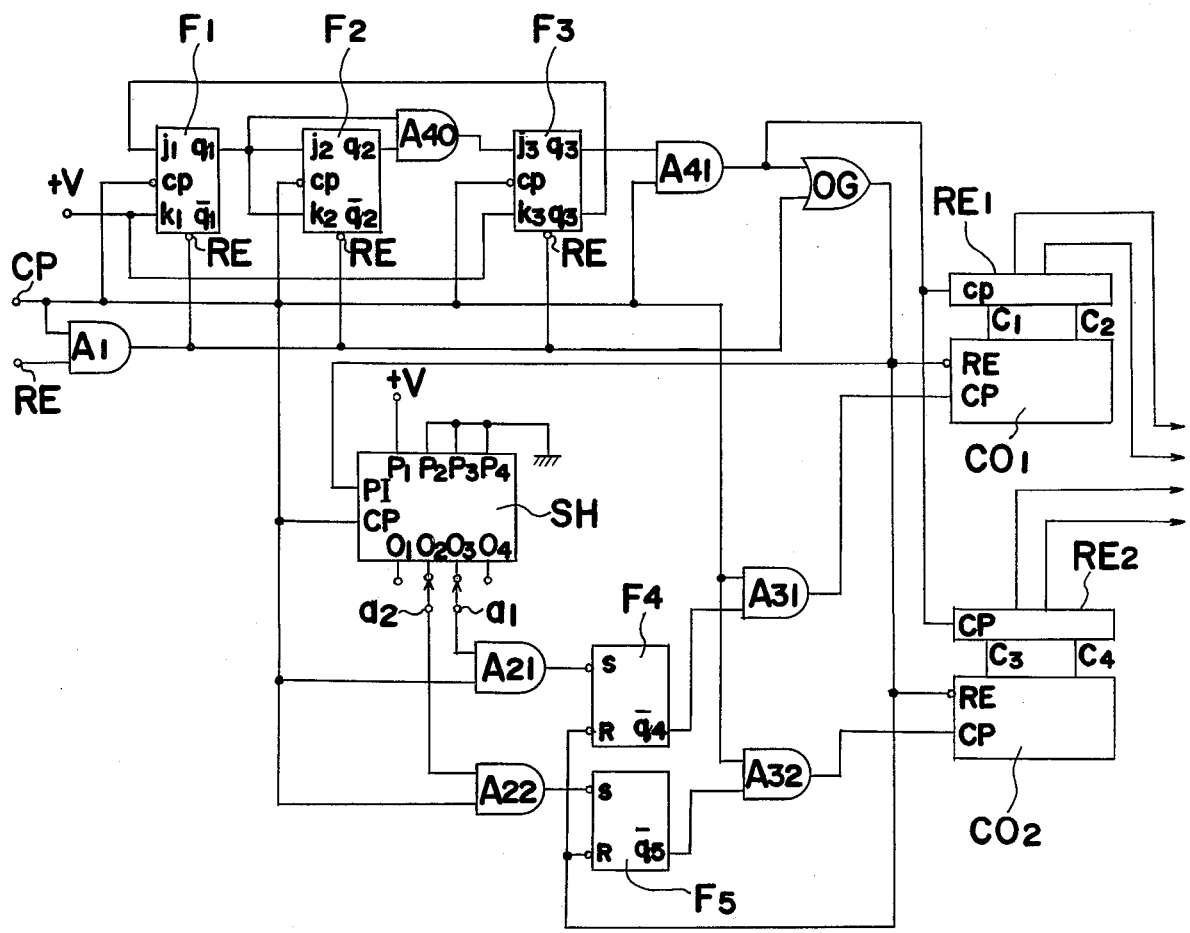
FIG. 7 is a view similar to FIG. 2, but particularly showing a block diagram of another modified embodiment of that shown in FIG. 2, wherein the inputting of a train of clock pulses into a respective counter is arranged to be controlled by a respective gate circuit means.
Figure 8:
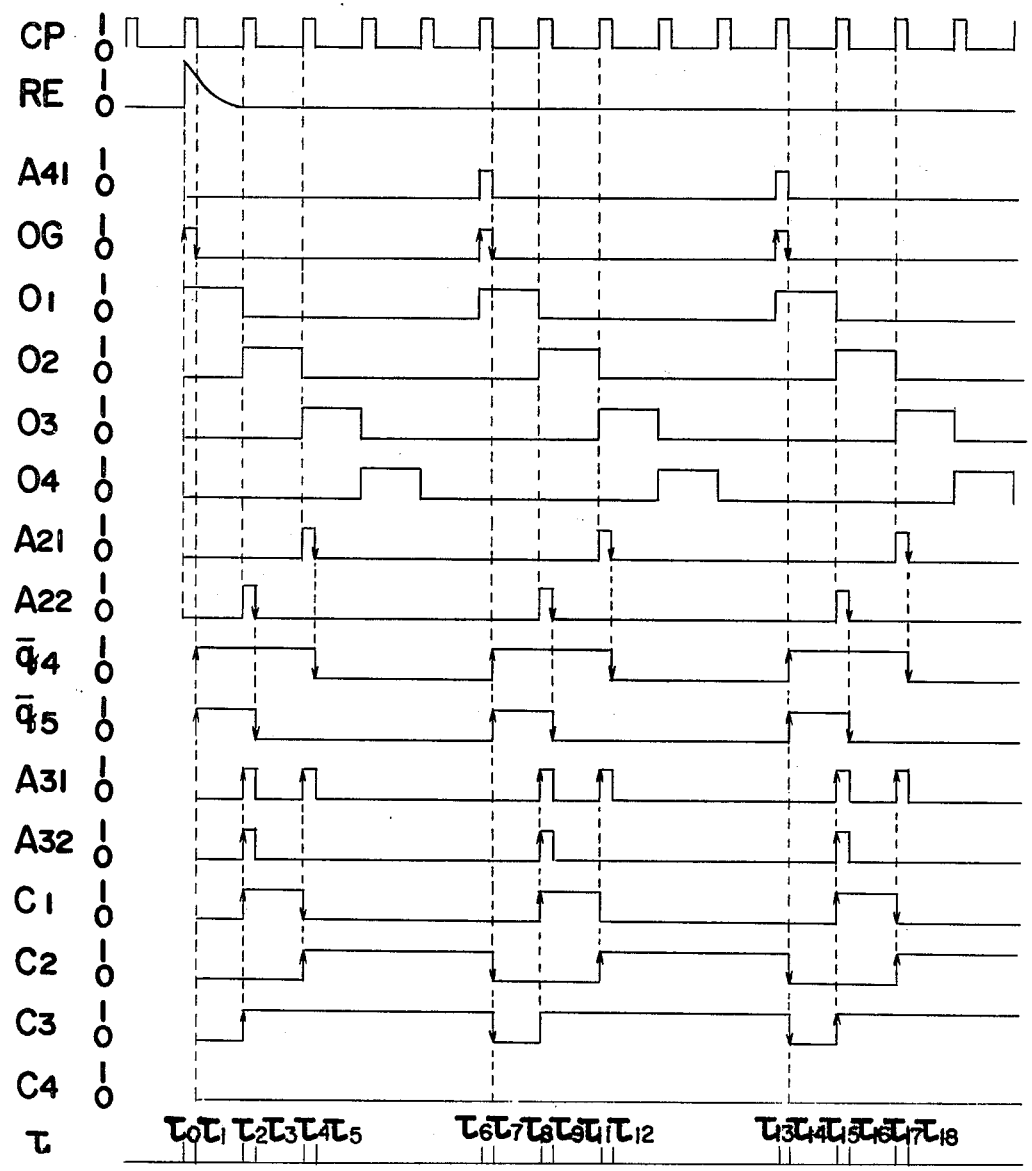
FIG. 8 is a view similar to FIG. 3, but particularly showing the functional characteristics of each component shown in FIG. 7 in synchronization with the successive generation of a train of clock pulses.

Referring now to FIGS. 7 and 8, FIG. 7 shows another modified embodiment of the present invention and FIG. 8 shows a time chart specifically illustrating the relative pulse correlation of the circuit components of the embodiment shown in FIG. 7.

According to FIG. 7, JK flip-flops $F_1$ to $F_3$ and AND circuits $A_{40}$ and $A_{41}$ are arranged to constitute a divide by 5 counter. By the arrangement mentioned above, as is specifically shown in FIG. 8, the fifth pulse of the train of clock pulses is the only pulse to be output from AND circuit $A_{41}$ through the actuation of the continuous train of clock pulses generated by the pulse generator; furthermore, the output from AND circuit $A_{41}$ is connected to respective terminals for the clock pulse input of respective registers $RE_1$ and $RE_2$. An OR circuit OG is provided in the circuit arrangement shown in FIG. 7 for outputting a resetting pulse as well as the pulse from AND circuit $A_{41}$. The output of the OR circuit means OG is applied to the respective reset input terminals R of RS flip-flops $F_4$, $F_5$ and to the respective reset input terminals RE of counters $CO_1$ and $CO_2$ and to the parallel-in terminal PI of the shift register SH. One of the input terminals of AND circuit $A_{21}$ is connected to the terminal $a_1$ and the other input terminal is connected to the clock pulse generator CP. The output terminal of AND circuit $A_{21}$ is connected to the set terminal S of RS flip-flop $F_4$. One of the input terminals of AND circuit $A_{22}$ is connected to the terminal $a_2$ and the other input terminal is connected to the clock pulse generator CP. The output terminal of AND circuit $A_{22}$ is connected to the set terminal S of RS flip-flop $F_5$. One input terminal of AND circuit $A_{31}$ is connected to the clock pulse generator CP and the other input terminal is connected to an asynchronous inversion output terminal $q_4$ of RS flip-flop of $F_4$, and the output terminal of AND circuit $A_3$ is connected to the clock pulse input terminal CP of a divide by four binary counter $CO_1$. One of input terminals of AND circuit $A_{32}$ is connected to the clock pulse generator CP, and the other input terminal is connected to an asynchronous inversion output terminal $q_5$ of RS flip-flop $F_5$. The output of AND circuit $A_{s2}$ is connected to a clock pulse input terminal CP of a divide-by-four binary counter $CO_2$.

In the following discussion, the functional characteristics of this circuit arrangement according to the present invention is detailed. Referring back to FIG. 8, when a resetting signal, which is rendered high in time interval corresponding to one cycle of the train of clock pulses, is added to the system of the present embodiment at a time denoted by $\tau_0$, the respective resetting signals effected in synchronization with the input of the train of clock pulses are output from the AND circuit $A_1$ and the OR circuit means OG. With the above-mentioned resetting signal, the divide by five counter, the four unit counter $CO_1$ and $CO_2$, and flip-flops $F_4$ and $F_5$ are successively placed in their respective reset modes, whereby the shift register SH is placed in a parallel inputting state, the output $O_1$ is rendered high, and the outputs $O_2$–$O_4$ are rendered low. Furthermore, as mentioned above, due to the dissappearance of the resetting signal at the time of $\tau_1$, the RS flip-flips are first to be reset, and therefore, the respective gates of the AND circuit $A_{31}$ and AND circuit $A_{32}$ are open. Accordingly, following the addition of the train of the clock pulses to the respective shift register SH and counters $CO_1$ and $CO_2$, a successive shift of a "high" signal, which is shifted to the most significant digit of the shift register SH, is successively accomplished in synchronization with every "leading edge" of the respective clock pulses; in addition, the respective outputs of counters $CO_1$ and $CO_2$ are successively changed in the following order: "00", "01", "10" and "11".

More specifically, flip-flop $F_5$ is set at a time denoted by $\tau_3$, i.e., the time of the disappearance of the first clock pulse, to cause the gate of the AND circuit $A_{32}$ to close, whereby the train of clock pulses is then not input into the counter $CO_2$ and accordingly, the counting step is prevented from being continued; in addition, the output, of the counter is left in the digital information state of "01". Following the disappearance of the successive clock pulse at $\tau_5$, flip-flop $F_4$ is set and therefore, the gate of the AND circuit $A_{31}$ is closed; similarly, the counting step is prevented from being continued, and the output of the counter is left in the digital information state of "10". Successively, upon the addition of the fourth clock pulse, the respective outputs from the shift register SH are all rendered low, and then, following the finish of the leading edge of a clock pulse output from the OR circuit means OG and in synchronization with the effect of the fifth clock pulse, i.e., at a time denoted by $\tau_6$, the digitalized information state of "01" from the counter $CO_1$ is stored in the register $RE_1$, and the digitalized information state of "10" from the counter $CO_2$ is stored in the register $RE_2$. At the disappearance of the clock pulse, as denoted by $\tau_7$, the respective flip-flops $F_4$ and $F_5$ and the counters $CO_1$ and $CO_2$ are again reset, respectively, to cause the shift register SH to be in the parallel input mode. Hereafter, the operation described above is successively repeated every successive fifth clock pulse of the pulse train, and the digital information word "1001", specified by 4 bits, is continuously output through the combination of the outputs of the two counters as long as the provisional setting statement is not modified in advance. When the provisional setting statement is modified, the contents of the respective registers are modified by the first successive fifth clock pulse of the cyclic pulse train output, occurring soon after the modification has been accomplished, since the cyclic storing with respect to the respective digital information output from the respective counters is arranged so as to be continued without any interruptions.

Referring now to FIGS. 9a and 9b, there is shown one embodiment of a mechanical arrangement employed for the embodiment shown in FIG. 2 according to the present invention. Two sliding members connected to the respective terminals $a_1$ and $a_2$, a plurality of members connected to the respective outputs $O_1$ to $O_4$, and a mechanical arrangement to cause the two sliding member to be slidably moved are specifically shown. Referring first to FIG. 9a, there is shown the specific mechanical arrangement mentioned above, illustrating the internal correlationship among the members employed for this embodiment, wherein the specified mechanical arrangement mentioned above comprises a manually operative information setting dial denoted by A, a pair of gears B and C mechanically attached to spindle D which is attached to the information setting dial A mentioned above, the spindle and gears being respectively rotated following a step by step rotation of the information setting dial A, a gear F defined with a unity gear ratio with respect to the gear B, a gear G defined with a relative gear ratio of four to one with respect to the gear C, a rotating disc H coupled with the gear F through a spindle E so as to be rotated in association with the rotation of the gear F, the sliding member 50 connected to the gear G at its one end, and the sliding member 60 connected to the rotating disc H at its one end. As is clear from the arrangement shown in FIG. 9a, the relative movement between the members comprising the arrangement described above is to be initiated by a step by step rotating movement of the information setting dial denoted by A, which is arranged to be manually rotated in the manner mentioned above through a successive rotating arrangement equipped with a successively actuating means of a click stop or pawl type.

It is to be noted that the arrangement described above is to be applied to the embodiment shown in FIG. 2, wherein each of the sliding members 50 and 60 is arranged to be independently slidably moved, the number of the members to be contacted being only four for this embodiment and being denoted by 10 to 40. Furthermore, according to this embodiment, the array of the members to be slidably moved by the two sliding members are modified as to form a circle, when compared with those shown in FIG. 4.

By the arrangement described above, following the rotating movement of the information setting dial A, the rotating disc H is rotated an angle corresponding to that effected by the rotation of the information setting dial A; the gear G, however, is simultaneously rotated only one-fourth the angle of that effected by the rotation of the information setting dial A. Consequently, the circuit arrangement effected by this embodiment, by means of the two independently rotating sliding members, is equivalent to a combination of the embodiment shown in FIG. 4 and its driving means (not shown), in which the respective sliding members are paired furthermore, the sliding member 50 is capable of being linearly slidably moved on four members to be contacted one by one, for example, (the members labelled by 12 to 42,) while the sliding member 60 is slidably moved over only one member, (for example, correspondingly, the member 20), during the same entrained movement.

Furthermore, as far as an application of the embodiment shown in FIGS. 9a and b to the embodiment shown in FIG. 5 is concerned, the same concept disclosed in these figures is alternatively applicable, only if the number of gears to be mutually correlated is increased; the gear ratio of the respective paired gears is arranged to have the ratio of one to one, one to four, and one to sixteen, respectively.

Furthermore, the above-mentioned arrangement to be utilized for driving the paired or independent sliding members can be modified in various manners and is not limited to the embodiments disclosed above. For example, a cam mechanism may be also advantageously used for simultaneously driving a plurality of the sliding members, although the details thereof are not specifically described here.

Referring to FIG. 10, there is shown an other embodiment of the mechanical arrangement for driving the sliding members according to the present invention, specifically indicating a detailed feature of the arrangement mentioned above when applied to a setting dial of an exposure information. The arrangement comprises a manually operative dial 10A, a plurality of gears 11A to 14A, a rotating disc 15A, and a plurality of sliding members 16A, 17A and 18A. It is noted that the members 20A to 23A are arranged to form a semi-circle and furthermore, the number of sliding members to be connected to $a_1$ is two, according to this embodiment. As already disclosed with reference to FIGS. 9a and 9b, a combination of the manually operative dial 10A and gears 11A and 12A, which are coupled with a common axle, is naturally rotated as the unit. The relative rotational ratio provided for the paired gears 11A and 13A is one to two, and the ratio for the paired gears 12A and 14A is two to one. The respective gears 13A and 14A are independently rotated without causing any mutual rotational restriction, and the rotating disc 15A is rotated in association with the rotational movement of the gear 13A. The sliding member 16A is successively slidably moved on a plurality of the members 20A to 23A following the rotation of the gear 14A. One end of each of the paired sliding members 17A and 18A is secured to the rotational disc 15 and they are arranged such that either one of the sliding members 17A or 18A must be in contact with one of four members 20A to 23A through the free ends of one of the above-mentioned sliding members at all times. Each of the members 20A to 23A is connected to the respective outputs $O_1$ to $O_4$ which are provided for the shift register 200 as shown in FIG. 2; the sliding member 16A is connected to the terminal $a_2$ while the paired sliding members 17A and 18A are respectively connected to the terminal $a_1$.

By the arrangement as described above, following the rotational movement of the exposure information setting dial 10A, the sliding member 16A, for example, is forced to be slidably moved on only the single member 23A, and the sliding member 18A is simultaneously slidably moved on members 23A to 20A arrayed in a manner as shown in FIG. 10 and successively the sliding member 17A is also slidably moved on members 23A to 20A during the time that sliding member 16A is slidably moved on only the single member 22A. Accordingly, as is clear from the foregoing description, either one of the sliding members 17A and 18A is to be alternatively positioned on one of the four members 20A to 23A at all times, and the terminal $a_1$ is always in contact with one of these members. Therefore, according to the present embodiment, there are sixteen setting combinations in which the respective terminals $a_1$ and $a_2$ are to be connected to the respective outputs $O_1$ to $O_4$ to be scanned by the respective above-mentioned sliding members in the manner as described in the foregoing. The number of setting combinations mentioned above is correspondingly equivalent to the representable number of combinations of digital information composed of 4 bits, which are to be output through D-flip-flops 401 to 404 as described earlier with reference to FIG. 2.

Figure 11:
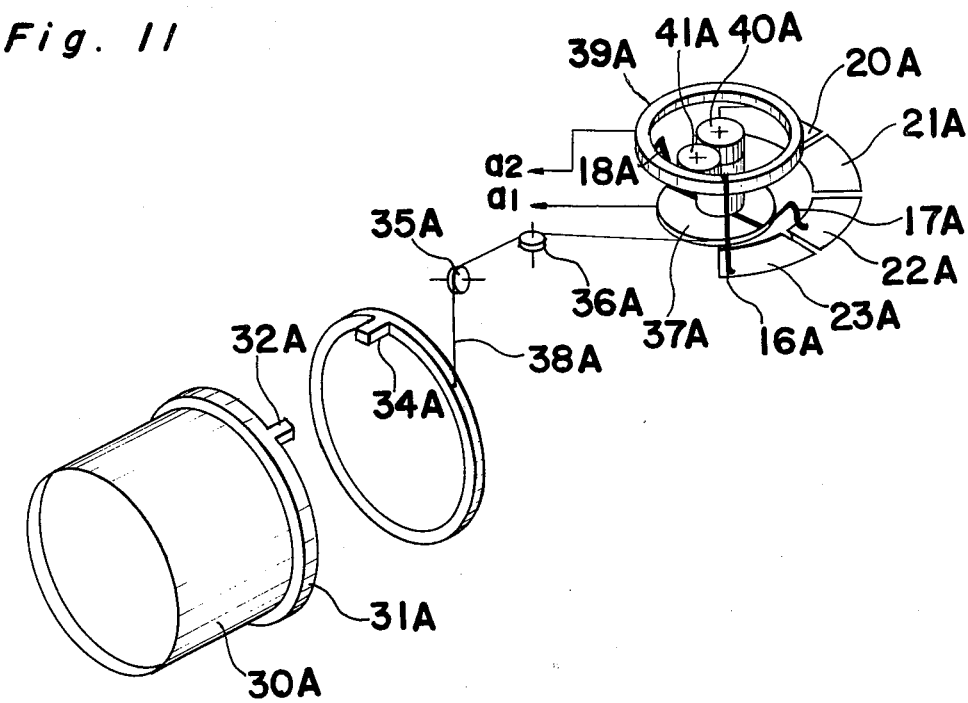
FIG. 11 is a perspective view of another modified embodiment of that shown in FIGS. 9(a) and 9(b), but specifically indicating a detailed feature when the above-mentioned embodiment is applied to an aperture information outputting device applicable for an interchangeable lens to be attached to the camera body.

Referring now to FIG. 11, there is shown another embodiment of the mechanical arrangement for driving the sliding members according to the present invention, specifically indicating the detailed features of the arrangement mentioned above when applied to an aperture information outputting device applicable for use with an interchangeable lens attached to the camera body. The aperture information outputting device mentioned above comprises an interchangeable lens 30A, a manual aperture adjusting ring 31A, a member 32A for transmitting an aperture adjusting information therethrough, a member 34A for receiving an aperture adjusting information therethrough, a string 38A, and a pair of pulleys 35A and 36A, wherein a specific position of the member 34A for receiving an aperture adjusting information therethrough is physically transmitted as a position signal through the string 38A and the pair of pulleys 35A and 36A, to a rotational disc 37A urgedly maintained counterclockwise.

To the rotational disc 37A, the respective sliding members 17A and 18A are secured, and following the rotational movement of the rotational disc 37A, a sun gear 40A is arranged to be successively rotated. In association with the rotational movement of the sun gear 40A, a planet gear 41A having a unity rotational ratio with respect to the sun gear 40A is first rotated, and an inside gear 39A having a rotational ratio of one fourth with respect to the planet gear 41A is successively rotated due to a specific arrangement of a planetary gear as shown in FIG. 10. Furthermore, another sliding member 16A is, secured to the inside gear 39A.

By the above-mentioned arrangement of the present embodiment, when the manual aperture adjusting ring 31A is rotated clockwise with respect to its longitudinal axis, the rotational disc 37A is successively rotated clockwise and the inside gear 39A is rotated counterclockwise. Such being the case, there is a difference in the rotational direction between the sliding member 16A and the pair of sliding members 17A and 18A. Therefore, when the pair of sliding members 17A and 18A are, for example, slidaby rotated along the output $O_1$ to $O_4$ of the shift register 200, the sliding member 16A is slidably rotated in a reverse direction, i.e., along the output $O_4$ to $O_1$, whereby the binary signal of 4 bits is similarly obtainable as the signal obtained in the embodiment shown in FIG. 10, only if the circuit arrangement is modified to cause the specific inverse signals $Q_3$ and $Q_4$ to be output through the respective D-flip-flops 403 and 404 as shown in FIG. 2.

Figure 12:
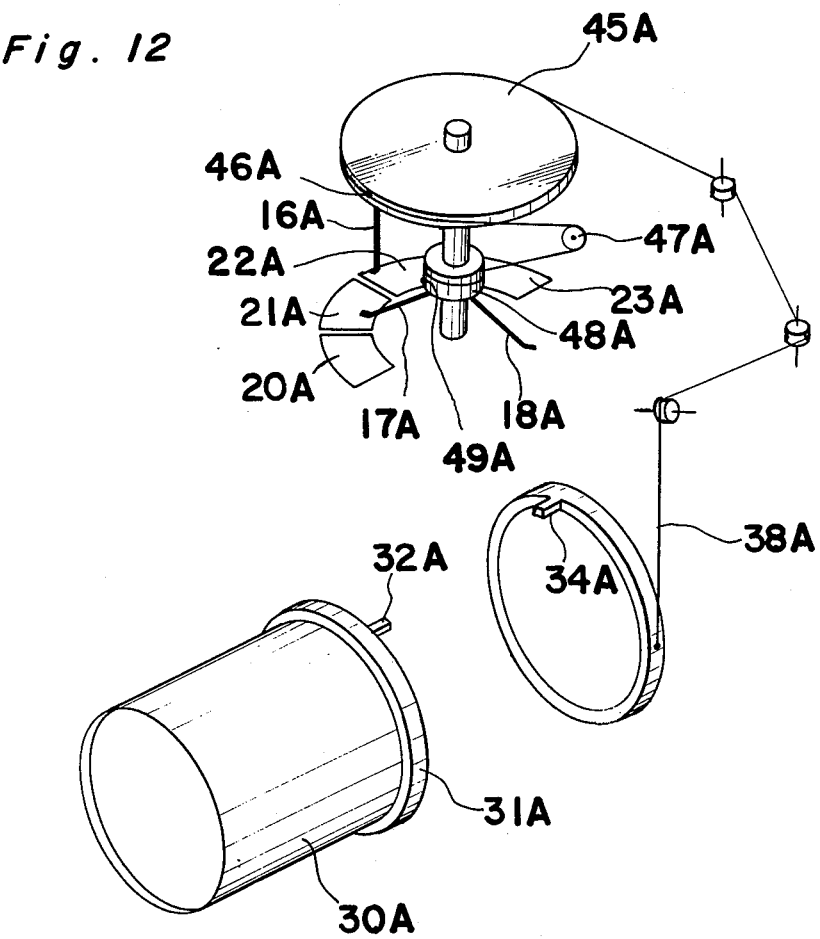
FIG. 12 is a perspective view of further modified embodiment of that shown in FIGS. 9(a) and 9(b), but specifically indicating a detailed feature when the above-mentioned embodiment is applied to a device similar to that shown in FIG. 11.

Referring now to FIG. 12, there is shown a modified embodiment of the embodiment shown in FIG. 11, with the mechanical arrangement for driving the sliding members being, here, specifically modified, when compared with the embodiment shown in FIG. 11. Therefore, before the description of the present embodiment proceeds, it is to be noted here that like parts are designated by the like reference numerals throughout the description of these two embodiments.

According to the present embodiment, rotational members 45A and 48A are both urged counterclockwise by means of a spring respectively, while the ratio in diameter of the member 45A to the member 48A is arranged to be 4 to 1. One end of the string internally stretching between two members 45A and 48A is secured to the rotational member 45A at a point denoted by 46A, while the other end of the string mentioned above is secured to the rotational member 48A at a point denoted by 49A. Therefore, following the clockwise rotation of the manual aperture adjusting ring 31A with respect to its longitudinal axis, the rotational members 45A and 48A are both rotated clockwise, whereby the ratio in respective moving distances of that of the sliding member 16A to those of the paired respective sliding members 17A and 18A is 1 to 4, and thereby sixteen combinations of digital signals or information composed of 4 bits can be output in a fashion obtained by the embodiment shown in FIG. 10. Furthermore, in the case in which the device shown in FIG. 10 and the device shown in FIG. 11 are both to be incorporated in the same camera, if the respective contacting members 20A to 23A shown in FIG. 10 as well as the respective members 20A and 23A shown in FIG. 11 are each correspondingly connected to the same, respective output terminals $O_1$ to $O_4$ to be scanned and constituting the same scanning circuit in the respective, same manners as described in the respective embodiments as shown in FIGS. 10 and 11, then the scanning circuit described above can output two different kinds of digital information or signals of respective 4 bits, after every scanning operation with respect to the plurality of outputs $O_1$ to $O_4$.

According to a further modified embodiment, if either another sliding member having a rotational rate of one fourth of that of the sliding member 16A or another sliding member having a rotational rate of 4 times of that of the respective paired sliding members 17A and 18A is added, and a specific counter is added in correspondence with either one of the further additions of the sliding members as described above, then various forms of information signals of 6 bits can be obtained by means of the further addition of a small number of mechanical provisions without adding any modifications to the arrayed pattern of the members as shown in FIGS. 10 and 11.

Furthermore, according to the other modified embodiment of the present invention, in addition to the introduction of a specific unit of members to be contacted by the sliding members, which is arrayed in a circle by making a plurality of members shown in FIG. 4 formed in the circle mentioned above, to the device disclosed in FIG. 10, if instead of members 20A to 23A provided in the embodiment shown in FIG. 10, with the respective sliding members 16A, 17A, 18A being correspondingly modified so that these are slidably moved on the respective members 10, 20, 30, and 40 of the members shown in FIG. 4, a sliding member having the same rotational rate as those of the respective sliding members 17A and 18A is further provided and arranged to be successively slidably moved on the members 11, 21, 31, 41, 12, 22, and so on, then it is possible to obtain a system arrangement wherein the information signals of 6 bits is being capable of being output.

Figure 13:
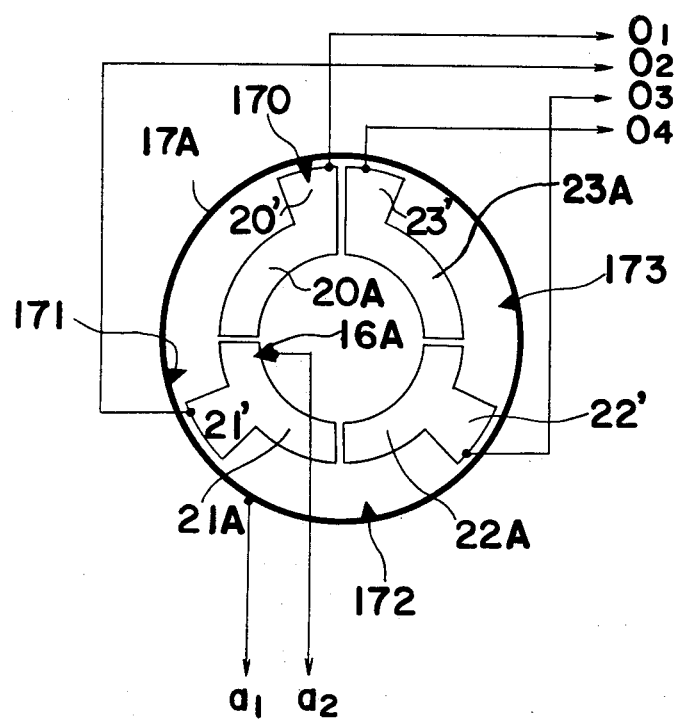
FIG. 13 is a view similar to FIG. 4, but particularly showing an another embodiment wherein an arrangement for the mutual contacts of the paired sliding members and the members to be contacted are modified.

Referring now to FIG. 13, there is shown another modified embodiment of the present invention, wherein the functioning of this embodiment is similar to that shown in FIG. 4, wherein a pair of sliding members 16A and 17A are slidably moved as one unit for the same displacement. According to this embodiment, the sliding member 17A comprises four inwardly protruded portions 170 to 173, while each member of 20A to 23A is provided with a respective projected portion of 20' to 23'. More specifically, the above-mentioned four protruded portions 170 to 173 are each provided for the sliding member 17A in a manner such that one of the above-mentioned protruded portions 170 to 173 is to be in contact with one of the projected portions 20' to 23', when the paired sliding members 16A and 17A are slidably moved in a stepwise manner. In the arrangement as described in FIG. 13, since the sliding member 16A is connected to the member 21A, and the sliding member 17A is connected to the member 20A through the protruded portion 170, the digital output is "0100". Through one stepwise counterclockwise rotational movement of the paired sliding members 16A and 17A from the above-described disposition, the protruded portion 171 is in contact with the projected portion 21' and thereby, the digitalized output of "0101" results. Through one more stepwise counterclockwise rotational movement, the protruded portion 172 is connected to the projected portion 22', whereby the digitalized representation of "0110" is output. On the contrary with respect to a rotational direction as described in the foregoing, when the paired sliding members 16A and 17A are stepwise and slidably moved for one step in a clockwise direction from the state as shown in FIG. 13, the sliding member 16A is connected to the member A, and the protruded portion 170 is connected to the projected portion 23', whereby the digitalized representation of "0011" is output.

As is clear from the foregoing description, an information input means available for digital control circuit means of a camera according to the present invention is arranged such that a plurality of output terminals of the scanning circuit means is capable of being successively scanned one by one in synchronization with the respective consecutive pulses of a train of clock pulses and the counter circuit means is arranged to successively count the number of pulses of the pulse train until the terminal determined in advance is scanned, so that a specific counting signal output from the counter circuit means at a time when it is scanned by the scanning circuit means is latched and converted into digital information through the remainder of the circuit arrangement of the present invention.

Although the number of the outputs to be scanned is always four for every embodiment described in the foregoing, i.e., $O_1$ to $O_4$, and every counter employed for the corresponding embodiments is a divide by four counter, according to the present invention, the number of outputs as well as the number by which each counter divides is not critical; however, if the number of output terminals is plural, then the number by which each counter divides must be less than the number of output terminals provided.

Moreover, the plurality of counters employed in a single circuitry arrangement is not necessarily arranged the same as that shown above, if properly arranged. Therefore, according to the present invention, an information input means is made available for use by the digital control circuit means of a camera only through the simple combination of conventional digital circuit components, and further characterized in that the number of compulsory contacting terminals is reduced when compared with that of conventional means used for the above-described purpose.

Furthermore, according to a plurality of combinations of a sliding member and its specific counter circuit means of the circuitry arrangement of the present invention, the counting so as to output a specific output signal to digitalize the upper digit of the binary code of the information signal, and the counting so as to output a specific output signal contributing to digitalize the lower digit of the binary code of the information signal can be separately accomplished at the same time, resulting in a decreased time necessary for counting, and thereby, the input process to transmit a single specific piece of information to the digital circuit means of a camera can be accomplished at quite a high rate.

Moreover, various kinds of information to be digitalized so as to be input into the digital control circuit means of a camera can be simultaneously treated, and may be input within quite a short time interval according to the circuitry arrangement of the present invention, because of the above-mentioned fact that a plurality of counting to output respective counting output signals to digitalize a plurality of information can be accomplished in parallel, wherein the terminals to be selected can be utilized in common with more than one respective sliding member, even when a plurality of informations is input in parallel; therefore, the number of terminals is naturally less than those found in the conventional arrangement utilizing such a decoder.

Furthermore, according to the system of the present invention, since the number of contacts is arranged so as to be reduced when compared with the conventional system provided with gray code board, an insufficiency in functioning of the system, which is often brought about through a wrong provisional contacting condition, is much decreased.

In spite of the small number of the sliding members in comparison with those conventionally prepared when the gray code is employed, according to the present invention, even if the contact between the contacting member and the sliding member happens to slip by one on the arrayed order from the proper predetermined contacting position, the resultant error effected may be only one digit of the lowest order bit, the above-mentioned situation of which can be often brought about in the contact between the gray code board and the contacting brush arrangement. Furthermore, the disposal pattern of the members to be contacted is much simpler than that to be arranged when a gray code board, is employed for the same purpose.

The application of the system for inputting information into a digital circuit means of a camera according to the present invention, is not limited, to the setting of the correct exposure value by processing a plurality of photographic information and the system informations and thereby, the system of the present invention can be applied to inputting information into any type or ordinal digital control circuit means.

Although the present invention has been fully described by way of example with reference to the accompanying drawings, it is to be noted that various changes and modifications are apparent to those skilled in the art. Therefore, unless such changes and modifications otherwise depart from the scope of the present invention, they should be construed as included therein.

What is claimed is:

1. A system for inputting information into a digital control circuit means of a camera, comprising:
   at least one clock pulse generating circuit means;
   scanning circuit means having a plurality of output terminals to be successively scanned one by one in synchronism with consecutive pulses of a clock pulse train; at least one terminal selecting means for selecting at least one of said output terminals according to predetermined selection; and at least one counting circuit means for counting said pulses of said clock pulse train, wherein at least one digitalized information signal, output from said counting circuit means at a predetermined time when one of said output terminals selected is scanned, is inputted through said terminal selecting means to said digital control circuit means as a digitalized information word in correspondence with said selection.

2. A system for inputting information into a digital control circuit means of a camera as claimed in claim 1, wherein there are included at least two paired said terminal selecting means and said counting circuit means, a first signal which is output from a first counting circuit means through a first predetermined selection of one of said output terminals with a first terminal selecting means and a second signal which is output from a second counting circuit means through a second predetermined selection of one of said output terminals with a second terminal selecting means, said first and second signals combined so that said respective signals comprise one digitalized information word in correspondence with said predetermined selections, said first and second signals combined in dependence upon information inputted into said digital control circuit means.

3. A system for inputting information into a digital control circuit means of a camera as claimed in claim 2, wherein said first counting circuit means and said second counting circuit means respectively comprise a first binary counter and a second binary counter, a first binary output from said first binary counter and a second binary output from said second binary counter arranged so that said first binary output forms the lower order digits of said digitalized information word in combination with said second binary output, said combination defining said digitalized information in binary code.

4. A system for inputting information into a digital control circuit means of a camera as claimed in claim 2, further comprising at least one more paired terminal selecting means and counting circuit means, so that at least one more signal output from said at least one more counting circuit means is combined with said first and second signal to form said digitalized information word in binary code and of an increased number of bits thereof.

5. A system for inputting information into a digital control circuit means of a camera as claimed in claim 2, wherein said respective terminal selecting means are moved for said respective selections in association with at least one movement of at least one manually operative information setting member.

6. A system for inputting information into a digital control circuit means of a camera as claimed in claim 5, wherein said terminal selecting means comprises at least two independent members, each of which is moved for said selection in association with said movement of said one manually operative information setting member, and wherein each movement of said two independent members is relatively restricted with respect to a predetermined ratio therebetween.

7. A system for inputting information into a digital control circuit means of a camera as claimed in claim 5, wherein said respective terminal selecting means are moved for respective said selections in association with said movement of said one manually operative information setting member without causing any mutual therebetween.

8. A system for inputting information into a digital control circuit means of a camera as claimed in claim 2, further comprising at least two manually operative information setting members, each of said two terminal selecting means being respectively independently moved in association with a movement of one of said two manually operative information setting members.

9. A system for inputting information into a digital control circuit means of a camera as claimed in claim 2, further comprising a plurality of contacting members arrayed side by side with respect to each other, said terminal selecting means forming a sliding member for slidably moving on said plurality of contacting members, the number of said contacting members corresponding to the number of said plurality of output terminals, wherein each of said contacting members is respectively connected to one of said plurality of said output terminals.

10. A system for inputting information into a digital control circuit means as claimed in claim 9, wherein said plurality of sliding members are slidably moved on said plurality of contacting members in association with a movement of at least one manually operative information setting member and wherein the respective sliding movements of said plurality of sliding members are relatively related with respect to each other by a predetermined correlation.

11. A system for inputting information into a digital control circuit means of a camera as claimed in claim 1, further comprising at least one latching circuit means for receiving a latching signal from said output terminal through said terminal selecting means at said predetermined time and for latching said digitalized information signal output from said counting circuit means at said predetermined time.

12. A system for inputting information into a digital control circuit means of a camera as claimed in claim 11, wherein said plurality of output terminals are repeatedly scanned at a predetermined cyclic rate and said counting circuit means are correspondingly repeatedly actuated to count said consecutive pulses of said pulse train, and wherein each of said latching circuit means repeatedly latches said signal output from said counting circuit means in association with said predetermined cyclic rate.

13. A system for inputting information into a digital control circuit means of a camera as claimed in claim 12, further comprising at least one register circuit means, said digitalized information signal which is output from said latching circuit means being stored in said at least one register circuit means after every repeated scanning of said plurality of output terminals at said predetermined cyclic rate.

14. A system for inputting information into a digital control circuit means of a camera as claimed in claim 1, further comprising at least one gate circuit means for preventing said clock pulse train from being transmitted to said counting circuit means to fix the output from said counting circuit means when said gate circuit means receives a signal output at said predetermined time from said terminal selecting means.

15. A system for inputting information into a digital control circuit means of a camera as claimed in claim 15, wherein said plurality of said output terminals are repeatedly scanned through a functioning effected by said scanning circuit means at a predetermined cyclic rate, a starting actuation as well as a stopping actuation of said counting circuit means being repeatedly effected in association with said functioning effected by said scanning circuit means.

16. A system for inputting information into a digital control circuit means of a camera as claimed in claim 15, further comprising at least one register circuit means, said signal output from said counting circuit means being stored in said at least one register circuit means after every repeated scanning of said plurality of output terminals at said predetermined cyclic rate.

17. A system for inputting into a digital control circuit means of a camera as claimed in claim 1, wherein said scanning circuit means comprises a shift register, each of said terminal selecting means having switching means capable of being selectively connected to one of said output terminals of said shift register therethrough, wherein a signal is transmitted from said selected output terminal of said shift register through said switching means at said predetermined time.

18. A system for inputting information into a digital control circuit means of a camera as claimed in claim 1, wherein said plurality of output terminals are repeatedly scanned at a predetermined cyclic rate and said counting circuit means are correspondingly repeatedly actuated to count said consecutive pulses of said pulse train.

19. A system for inputting information into a digital control circuit of a camera, comprising:
first means for generating a train of clock pulses;
second means having a plurality of terminals for scanning said plurality of terminals one by one in synchronism with said clock pulses;
third means for manually setting information to be input into said digital control circuit, said setting means having a plurality of terminal selecting members, each of said plurality of members for selecting a respective one of said plurality of terminals, the combination of selections of terminals by said plurality of terminal selecting members being determined in accordance with the manually set information;
fourth means for counting said clock pulses of said first means, said counting means having a plurality of pulse counters for counting said clock pulses in synchronism with the scanning of said second means, each of said plurality of pulse counters corresponding to a respective one of said plurality of terminal selecting members;
fifth means for marking the contents stored in each of said pulse counters when the terminal of said second means selected by the terminal selecting member corresponding to its respective pulse counter is scanned; and
sixth means for combining the contents stored in said plurality of pulse counters into a digital word in a predetermied manner, wherein said digital word corresponds to the information manually set by said third means.

20. A system as claimed in claim 19, wherein said fifth means comprises a plurality of latching circuits corresponding to said plurality of pulse counters, each of said latching circuits for respectively latching the contents of its corresponding pulse counter when the terminal of said second means selected by its corresponding terminal selecting member is scanned.

21. A system as claimed in claim 19, wherein said fifth means comprises a plurality of gate circuits corresponding to said plurality of pulse counters, each of said gate circuits for respectively stopping the pulse count of its corresponding pulse counter to fix the contents thereof when the terminal of said second means selected by its corresponding terminal selecting member is scanned.

22. A system as claimed in claim 19, wherein said sixth means comprises a register for storing data corresponding to a digital signal and means for respectively shifting the contents stored in each of said pulse counters marked by said fifth means into predetermined portions of said register.

23. A system as claimed in claim 19, further comprising means for periodically repeating the scanning by the second means, the counting by said fourth means, and the marking by said fifth means.

24. A system as claimed in claim 19, further comprising a plurality of patterned contacts connected to said terminals of said second means in a predetermined manner, wherein said third means comprises means for moving said terminal selecting members with the relative positions thereof unchanged by sliding said terminal selecting members on said plurality of patterned contacts to make electrical contact between said terminal selecting members and said plurality of pattern contacts, wherein the selections of terminals by said terminal selecting members occur in a predetermined manner according to the information to be set.

25. A system as claimed in claim 24, wherein said plurality of patterned contacts and said moving means are arranged such that a first one of said terminal selecting members is moved to select the terminals one by one and a second one of said terminal selecting members is moved to select all the terminals one by one while said first one of the terminal selecting members is moved to select each terminal, said terminal selecting members operating in response to the relative sliding of said moving means.

26. A system as claimed in claim 25, wherein said plurality of patterned contacts comprises a plurality of elongated and aligned contacts arranged along a circular sliding path of said first one of the terminal selecting members, each of said plurality of elongated and aligned contacts respectively connected to each of said terminals; and wherein said plurality of patterned contacts further comprises contact pieces equally spaced along a circle coaxial with said elongated and aligned contacts at a radial angle greater than the radial angle enclosed by one of said plurality of elongated and aligned contacts, each of said contact pieces respectively connected to each of said terminals; and wherein said second one of the terminal selecting members comprises a plurality of branches for engagement with said contact pieces, said branches being equally spaced along a circle coaxial with said elongated and aligned contacts at a radial angle substantially equal to the radial angle enclosed by one of said plurality of elongated and aligned contacts.

27. A system as claimed in claim 19, wherein said third means comprises a manipulating member operated in accordance with the information to be set and means for respectively controlling said terminal selecting members in predetermined differnet manners in response to the operation of said manipulating member.

28. A system as claimed in claim 27, wherein said controlling means is arranged such that a first one of said terminal selecting members is controlled to select the terminals one by one and a second one of said terminal selecting members is controlled to select all the terminals one by one while said first one of the terminals is controlled to select each terminal, said controlling means operating in response to the operation of said manipulating member; said manipulating member moving said first and second ones of said terminal selecting members with respect to the terminals such that said first one of said terminal selecting members moves at a lower speed than said second one of said terminal selecting members.

29. A system for inputting information into a digital control circuit of a camera, comprising:
first means for generating a train of clock pulses;
second means having a plurality of terminals for scanning said plurality of terminals one by one in synchronism with said clock pulses;
third means for manually setting information to be input into said digital control circuit, said setting means having at least one terminal selecting member, said member for selecting one of said plurality of terminals, the selection of a terminal by said terminal selecting member being determined in accordance with the manually set information;
fourth means for counting said clock pulses of said first means, said counting means having at least one pulse counter for counting said clock pulses in synchronism with the scanning of said second means;
fifth means for marking the content stored in said pulse counter when the terminal of said second means selected by the terminal selecting member is scanned; and
sixth means for reading the marked content of said pulse counter as a digital word in a predetermined manner, wherein said digital word corresponds to the information manually set by said third means.

* * * * *